US010215333B2

(12) United States Patent
Goldstein

(10) Patent No.: US 10,215,333 B2
(45) Date of Patent: Feb. 26, 2019

(54) APPARATUS, SYSTEM AND METHOD FOR CAPTURING AND BROADCASTING EVENTS

(71) Applicant: SOLOCAM FOREVER LTD., Airport City (IL)

(72) Inventor: Ben Zion Yitzchak Goldstein, Ashkelon (IL)

(73) Assignee: Solocam Forever Ltd., Airport City (IL)

( * ) Notice: Subject to any disclaimer, the term of this patent is extended or adjusted under 35 U.S.C. 154(b) by 0 days.

(21) Appl. No.: 15/313,349

(22) PCT Filed: Jun. 7, 2015

(86) PCT No.: PCT/IL2015/050575
§ 371 (c)(1),
(2) Date: Nov. 22, 2016

(87) PCT Pub. No.: WO2016/103244
PCT Pub. Date: Jun. 30, 2016

(65) Prior Publication Data
US 2017/0191615 A1    Jul. 6, 2017

Related U.S. Application Data

(60) Provisional application No. 62/095,037, filed on Dec. 21, 2014.

(51) Int. Cl.
*H04R 1/08*   (2006.01)
*H04N 5/225*   (2006.01)
(Continued)

(52) U.S. Cl.
CPC ............ *F16M 13/04* (2013.01); *F16M 11/08* (2013.01); *F16M 11/10* (2013.01);
(Continued)

(58) Field of Classification Search
USPC .......................................................... 396/420
See application file for complete search history.

(56) References Cited

U.S. PATENT DOCUMENTS 4,176,922 A * 12/1979 Roth ...................... G03B 31/00
352/27
4,752,794 A    6/1988 Bohannon
(Continued)

FOREIGN PATENT DOCUMENTS

CN   203979828 U   12/2014
DE      2555761 A1    6/1977
(Continued)

OTHER PUBLICATIONS

International Search Report for PCT/IL2015/050575; dated Sep. 20, 2015; 4 pages.
(Continued)

*Primary Examiner* — Clayton E. LaBalle
*Assistant Examiner* — Linda B Smith
(74) *Attorney, Agent, or Firm* — Laurence A. Greenberg; Werner H. Stemer; Ralph E. Locher

(57) ABSTRACT

An events capturing apparatus for assisting a user to capture events comprising a support arm that includes a proximal end configured to removably receive a sound capturing device and a distal end configured to removably receive an image capturing device, and a handle coupled to the proximal end of the support arm and shaped to be held by the user. In some embodiments, the image capturing device is a smart-phone camera and the sound capturing device is a microphone.

13 Claims, 9 Drawing Sheets

(51) Int. Cl.
*F16M 13/04* (2006.01)
*F16M 11/10* (2006.01)
*F16M 11/20* (2006.01)
*F16M 11/26* (2006.01)
*H04N 5/232* (2006.01)
*F16M 11/08* (2006.01)
*F16M 11/28* (2006.01)

(52) U.S. Cl.
CPC ..... *F16M 11/2014* (2013.01); *F16M 11/2021* (2013.01); *F16M 11/26* (2013.01); *F16M 11/28* (2013.01); *H04N 5/225* (2013.01); *H04N 5/2251* (2013.01); *H04N 5/23206* (2013.01); *H04R 1/08* (2013.01); *H04N 5/23203* (2013.01)

(56) References Cited

U.S. PATENT DOCUMENTS

| | | | |
|---|---|---|---|
| 7,204,650 B2 | 4/2007 | Ghanouni et al. | |
| 8,045,051 B2* | 10/2011 | Terakado | H04N 5/2251 348/231.7 |
| 9,113,060 B2* | 8/2015 | Akiyama | H04N 5/2251 |
| 9,458,963 B1* | 10/2016 | Choi | F16M 13/022 |
| 9,628,690 B2* | 4/2017 | Fisher | H04N 5/23203 |
| D788,081 S* | 5/2017 | Austin-Smith | D14/226 |
| 2003/0218105 A1* | 11/2003 | Sones | A61J 9/0692 248/104 |
| 2006/0007551 A1* | 1/2006 | Sakurai | G02B 7/14 359/611 |
| 2007/0053680 A1* | 3/2007 | Fromm | F16M 11/14 396/420 |
| 2008/0252752 A1* | 10/2008 | Kosaka | H04N 5/2252 348/231.99 |
| 2014/0027596 A1* | 1/2014 | Chang | A45F 5/00 248/333 |
| 2014/0354839 A1 | 12/2014 | Yu | |
| 2017/0366746 A1* | 12/2017 | Yu | H04N 5/23222 |

FOREIGN PATENT DOCUMENTS

| | | | |
|---|---|---|---|
| EP | 2722728 A1 * | 4/2014 | ............. F16M 13/04 |
| EP | 3091730 A1 | 11/2016 | |
| WO | 2007/028618 A1 | 3/2007 | |
| WO | 2011050349 A1 | 4/2011 | |

OTHER PUBLICATIONS

Written Opinion of the International Searching Authority for PCT/IL2015/050575; dated Sep. 20, 2015; 5 pages.

Jefferson Graham, "Review: Which is the right new GoPro for you?", USA Today, Oct. 4, 2014 (5 pages).

Supplementary European Search Report for a counterpart foreign application—EP 15 87 2089; dated Nov. 29, 2017, 2 pages.

Search Report for a counterpart foreign application—EP 15 87 2089; dated Nov. 29, 2017, 4 pages.

* cited by examiner

APPARATUS, SYSTEM AND METHOD FOR CAPTURING AND BROADCASTING EVENTS

TECHNICAL FIELD

Embodiments disclosed herein generally relate to devices, systems a methods for providing live or delayed coverage of events.

BACKGROUND

Currently, the coverage and reporting of an event which by a broadcasting station, which is not taking place in a studio environment usually includes the dispatching of a reporter crew to the event location. This may be relatively expensive because of the equipment and personnel involved. Accordingly, the number of events that can be covered with crew members of the broadcasting station is limited.

Logistical problems may in particular arise in providing live coverage and reporting of unannounced and developing events. The coverage of such events require the dispatching of the crew to the event location as quickly as possible to avoid missing out on reporting details of the event. Traffic congestion on the way to the location and shortage of equipment for instance may cause delay in the reporting of the event as it occurs.

There is thus a need to reduce the costs that are involved in providing coverage of an event while increasing logistical flexibility.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In an one aspect, the invention relates to a holding assembly for a portable digital device for supporting and interacting with an image capturing device via wired or unwired communication network, said assembly comprising: a. a support arm that includes a distal end configured to removably receive an image capturing device; b. a sound capturing device coupled to the proximal end of the support arm; and c. a control unit provided with a user interface, which enables controlling the settings of the image capturing device and/or of the sound capturing device and/or of the broadcasting using a dedicated application.

In an embodiment of the invention the assembly further comprising a removable handle coupled to the proximal end of the support arm which is shaped to be held by the operator, wherein said handle is coupled with a sound capturing device and wherein said handle and sound capturing device are connected to the image capturing device via wired or wireless communication network.

In an embodiment of the invention, the handle comprises one or more metal plate(s) with peripheral edges for allowing one or more magnet(s) to be attached thereto in a stable manner.

In some embodiments there is provided an events capturing apparatus for assisting a user to capture events, comprising a support arm that includes a proximal end configured to removably receive a sound capturing device and a distal end configured to removably receive an image capturing device, and a handle coupled to the proximal end of the support arm and shaped to be held by the user. The image capturing device may include a portable electronic device having imaging and sound recording capabilities, for example a smart-phone, a tablet computer, a personal digital assistant, a wearable device, a handheld computer and/or a notebook computer. The sound capturing device may exemplarily be a microphone. Exemplarily, an events capturing apparatus disclosed herein may enable both taking of "selfie" still and video images as well as recoding of accompanying sound, thereby providing a full "reporting" capability, this capability requiring a single operator.

In some exemplary embodiments, an events capturing apparatus may further comprise a display and an input device operatively coupled with the display for controlling the scrolling of text on the display.

In some exemplary embodiments of the apparatus, the handle may include a single handle member. In other exemplary embodiments, the handle may include two handle members. In such "two-handle member" embodiments, the handle may have an oval shape for example: a U-shaped or O-shaped body. In exemplary embodiments, the handle may be tiltable towards the support arm into a handle-collapsed configuration, and away from the support arm into a handle-expanded configuration. In the handle-expanded configuration, the handle may be in an about vertical position relative to the support arm, and in the handle-collapsed configuration, the handle may abut against the support arm.

In some exemplary embodiments, the handle may be fixedly coupled to the support arm with respect to a rotating movement around an imaginary main axis which is about vertical to the longitudinal extension of the support arm and which extends from the proximal end, such that pivoting the handle around the said vertical main axis causes the rotation of the support arm to the same extent. In some exemplary embodiments, the handle may be pivotable relative to the support arm.

BRIEF DESCRIPTION OF THE DRAWINGS

The drawings and descriptions are meant to illuminate and clarify embodiments disclosed herein, and should not be considered limiting in any way.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

The present invention relates to a holding assembly for a portable digital device for supporting and interacting with an image capturing device (such as a image capturing device) via wired or unwired communication network. The assembly comprising: (a) a support arm that includes a distal end configured to removably receive an image capturing device; (b) a microphone coupled to the proximal end of the support arm; and (c) a control unit provided with a user interface, which enables controlling the settings of the image capturing device and/or of the microphone and/or of the broadcasting using a dedicated application. Aspects of embodiments relate to an events-capturing apparatus comprising a portable equipment support arm. The portable equipment support arm is configured to receive or accommodate (e.g. in a removable manner) an image capturing device at a first "distal" end and is further configured to receive or accommodate (e.g. in a removable manner) at a second "proximal" end a sound capturing device. The proximal end further comprises a handle allowing a user to hold the apparatus. Data descriptive of the images and sound captured by the image and sound capturing devices may be stored on a memory and then transmitted to output devices for being displayed to an audience.

The terms "distal" and "proximal" as used herein refer to the position of the image and sound capturing device relative to a user of the device. When in use, the equipment support arm may be positioned such that the sound capturing device is held proximal to the user and the image capturing device distal to the user.

As outlined herein below in greater detail, aspects of embodiments may also relate to a computerized system for comprising the apparatus with the image and sound capturing devices mounted thereon, as well as to a method for operating the system.

Figure 1B:
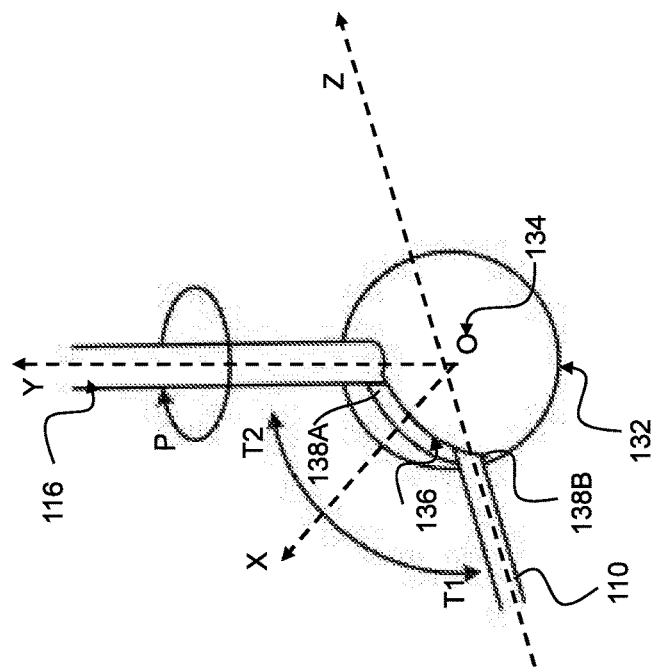
FIG. 1B is a schematic isometric illustration of a proximal coupling joint member of the events capturing apparatus, according to some embodiments.
Figure 1A:
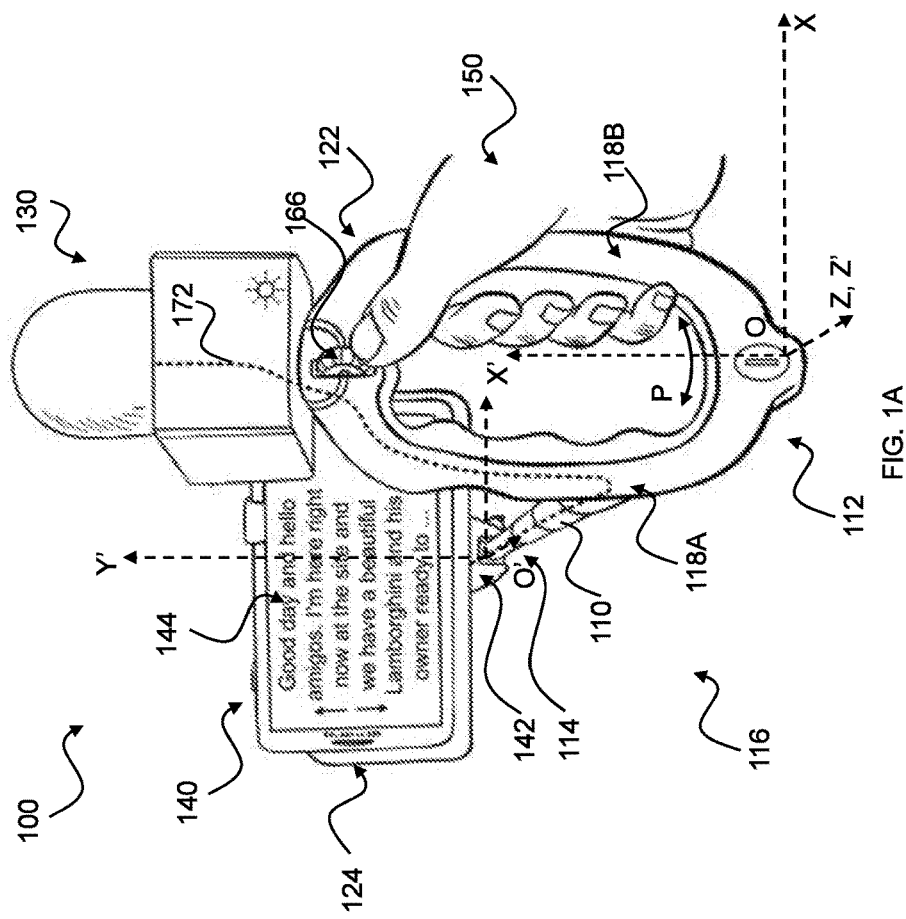
FIG. 1A is a schematic isometric illustration of an events capturing apparatus when in use, according to some embodiments.

Reference is now made to FIG. 1A and FIG. 1B. An events capturing apparatus 100 comprises an equipment support arm 110 having a proximal end 112 and a distal end 114. Support arm 110 includes a handle 116 arranged at its proximal end 112. The handle may have a shape designed to accommodate holding with one hand or with two hands. Support arm 110 may further include a first coupling hardware element 122 configured to enable the coupling (e.g., in a removable manner) of, for example, a sound capturing device 130 (e.g. a microphone), at the proximal end of support arm 110. In some embodiments, sound capturing device 130 may be mounted on handle 116. In some embodiments, as in FIG. 1A, handle 116 may have a double-handle element which includes a first and a second handle member, respectively 118A and 118B, to facilitate handing over apparatus 100 from one user to another. Double-handle element allows a first user to hold on events capturing apparatus 100 at first handle member 118A until a second user grabs and securely holds the events capturing apparatus by second handle member 118B. Double-handle element may come in various shapes and forms. For example, as illustrated schematically in FIG. 1A, double-handle element of handle 116 may have an O-shaped body. Alternatively, it may have an U-shaped body (not shown) or oval shaped body. In some embodiments, see e.g. FIG. 1B, handle 116 may be stick-shaped and therefore have only one handle member.

Figure 2B:
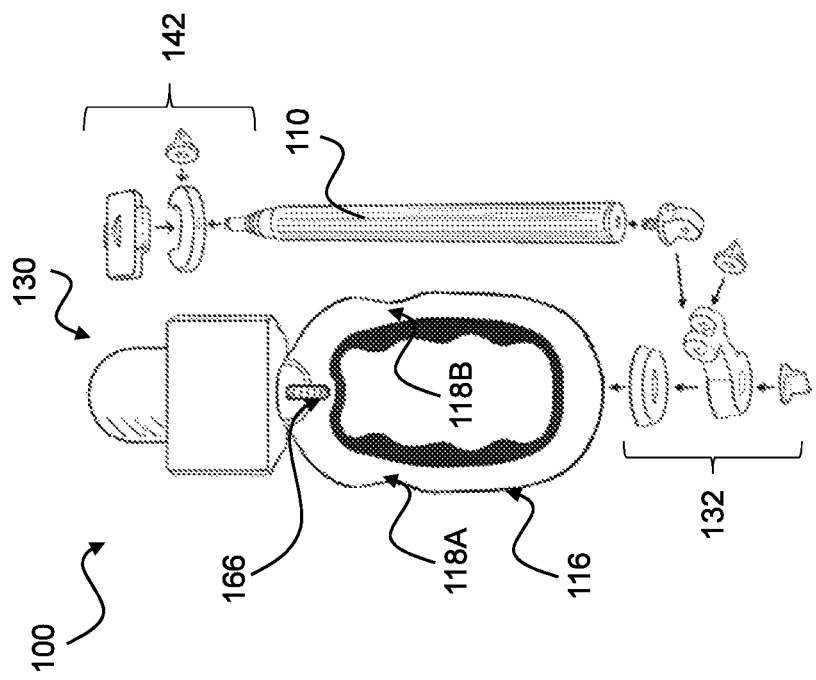
FIG. 2B is a schematic isometric exploded view illustration of the events capturing apparatus in collapsed configuration, according to some embodiments.

Support arm 110 may have at distal end 114 a second coupling hardware element 124 joined to arm 110 by a distal coupling joint member 142. Hardware element 124 is configured to enable the removable coupling of, for example, an image capturing device 140. Support arm 110 has a longitudinal extension which defines a main axial direction Z. Image capturing device 140 may be included in a computerized end-user device. Such computerized end-user device may include a multifunction mobile communication device also known as "smart-phone", a tablet computer, a personal digital assistant, a wearable device, a handheld computer and/or a notebook computer. An isometric exploded view of an exemplary proximal coupling joint member 132, as well as an isometric exploded view of distal coupling joint member 142, according to some embodiments, is shown in FIG. 2B.

Merely for the sake of the discussion that follows, the terms "main axial direction or axis Z, X and Y", as well as grammatical variations thereof, refer to directions defined by a main Cartesian coordinate system whose imaginary origin O is generally located at proximal end 112 of support arm 110 where handle 116 is coupled with support arm 110, e.g., by a proximal coupling joint member 132. Accordingly, the position of imaginary main origin O may about coincide with the position where first coupling hardware element 122 is coupled with support arm 110.

Merely for the sake of the discussion that follows, the terms "secondary axial direction or axis Z', X' and Y'" as well as grammatical variations thereof, refer to the axes of a secondary Cartesian coordinate system with an imaginary secondary origin O' that coincides with the position where second coupling hardware element 124 is coupled (e.g., removably) with support arm 110.

Handle 116 may be arranged with respect to main axis Z of support arm 110 such that the user can easily grab and comfortably hold handle 116 either with his/her right or left hand. This allows sound capturing device 130 to be proximal to the user and image capturing device 140 distal to the user. Handle 116 may for example have a body of longitudinal extension which defines a main axial direction Y that may point in a generally upward direction with respect to the ground. More specifically, events capturing apparatus 100 may be configured such that when user's palm and fingers 150 embrace handle 116, the longitudinal extension of the handle has a generally perpendicular orientation relative to the ground and axis Z extends away from the user about parallel to the ground. This positions second coupling hardware 124 distally from the user. Handle 116 may be a handle of sound capturing device 130.

According to some embodiments, support arm 110 may be coupled with handle 116 such to be fixed in position with respect to a pivoting movement of handle 116 around main axis Y, see FIG. 1B. Correspondingly, the pivoting of handle 116 to traverse an angle may cause support arm 110 to traverse the same angle around main axis Y. Support arm 110 may for example be interlockingly, or otherwise stated, form-lockingly engaged with respect to handle 116 through proximal coupling joint member 132. For example, support arm 110 may be coupled with handle 116 through a hinge 134 and guide element 136 (FIG. 1B). Guide element 136 may for example be embodied by a groove or indentation 136 formed in coupling joint member 132 and may have sidewalls 138A and 138B. Hinge 134 may pass through the groove from one sidewall to the other and through an opening (not shown) formed in support arm 110. Thus, hinge 134 and guide element 136 confine support arm 110 and handle 116 to tilt towards or away from each other, as schematically illustrated by arrows T1 and T2, respectively. The extension of the tilting movement may be limited to, for example, about 90°. In other words, handle 116 may be tiltable until the handle is about vertical relative to support arm 110.

Sidewalls 138A and 138B of guide element 136 also forces support arm 110 to pivot around main Y axis to the extent of the pivoting of handle 116. According to some embodiments, handle 116 is fixedly coupled to proximal coupling joint member 132 and a portion of proximal end 112 of support arm 110 may be inserted and held by hinge 134 within guide element 136 and tiltable within the slot relative to handle 116. According to some other embodiments, support arm 110 may be fixedly coupled to proximal coupling joint member 132 and a lower end of handle 116 may be inserted and held by hinge 134 within guide element 136 such to be tiltable within the guide element relative to support arm 110. Either way, the tilting movement of handle 116 relative to support arm 110 is limited by stopper sidewalls 138A and 138B of guide element 136.

According to embodiments, handle 116 may be pivotably coupled with support arm 110 such that support arm 110 may be pivotable around main axis Y (e.g., by an angle of about 270 degrees) at least along with second coupling hardware element 124, as schematically indicated by arrow P (FIG. 1B), while the orientation of handle 116 remains stationary. Accordingly, second coupling hardware element 124 and image capturing device 140 mounted thereon may be swivable around handle 116 and sound capturing device 130. Support arm 110 may be releasably lockable into one or more pivoting orientations relative to handle 116, e.g., by lockingly engaging a suitable locking mechanism or arresting mechanism (not shown).

Second coupling hardware element 124 may be pivotably coupled with support arm 110 by a distal coupling joint member 142 such that second coupling hardware element 124 is tiltable towards support arm 110 through pivoting around a secondary axis X. In some embodiments, second coupling hardware element 124 may additionally be pivotable around secondary axis Z' and/or Y'. Main Z axis and secondary Z' axis coincide with each other.

Figure 2A:
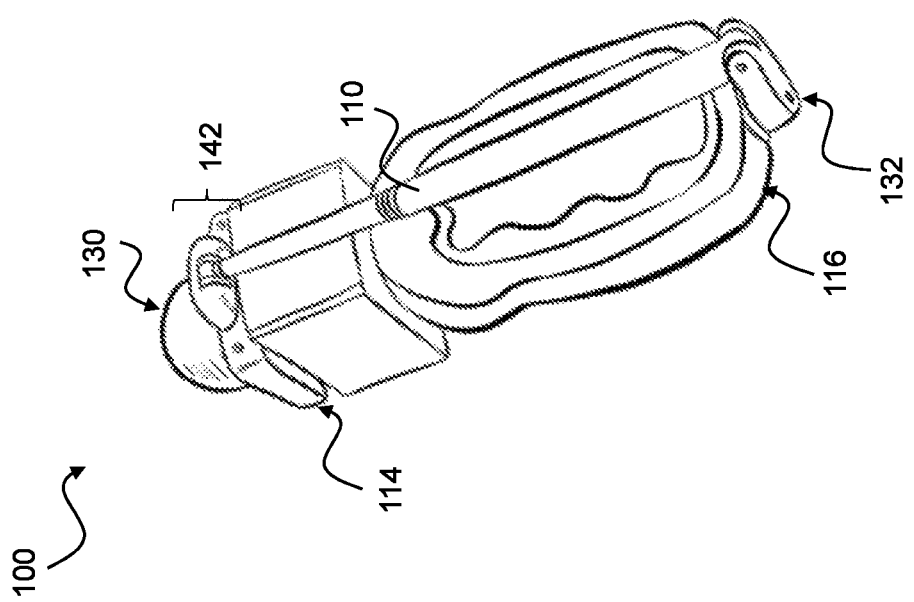
FIG. 2A is a schematic isometric illustration of the events capturing apparatus in fully collapsed configuration, according to some embodiments.

Additional reference is now made to FIG. 2A. Events capturing apparatus 100 may be collapsible from an expanded configuration, schematically shown in FIG. 1A, into a collapsed configuration, schematically shown in FIGS. 2A and 2B, and vice versa. For example, support arm 110 may be configured to be telescopically extendable and retractable along main axial direction Z. Moreover, as already briefly discussed herein above, handle 116 may be tiltable towards support arm 110, into a handle-collapsed configuration, and away from support arm 110 into a handle-expanded configuration.

To bring events capturing apparatus 100 into its collapsed configuration, support arm 110 may have to be telescopically retracted and handle 116 tilted into the handle-collapsed configuration. When in the fully collapsed configuration, second coupling hardware element 124 may fittingly engage with sound capturing device 130.

Figure 4:
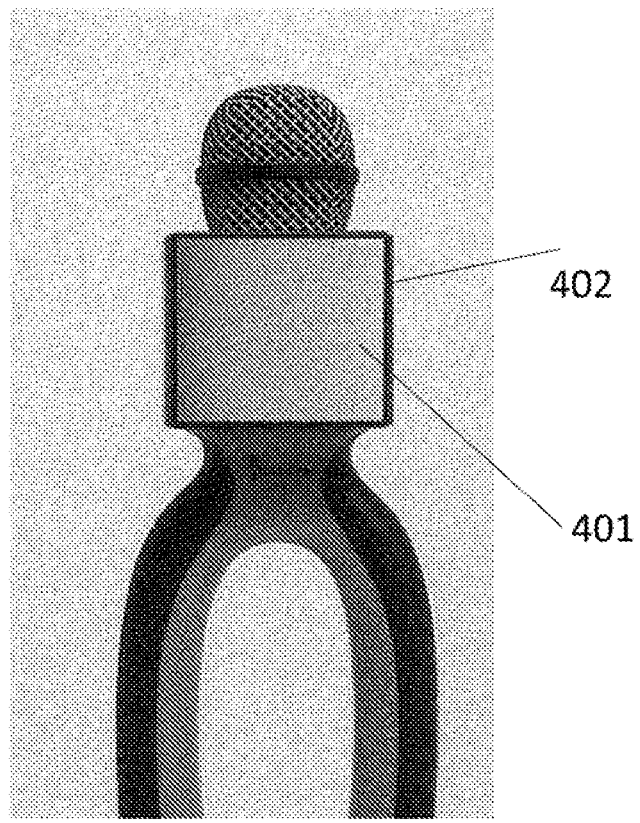
FIG. 4 schematically shows the metal plates for magnets according to an embodiment of the present invention.

FIG. 4 schematically shows the handle of the invention. According to an embodiment of the invention, handle 116 comprises metal plates 401 for magnets. The metal plates are positioned on the handle so that there is a peripheral edge 402 which supports the magnets to be stable and not to move. A use of the metal plates with magnets can be for example when broadcasting for a specific channel, the operator can attach a magnet with the logo of said channel and then if using the device for another channel, change easily the magnet to the proper magnet with the logo of another channel.

In another embodiment the device comprises a control unit which connects to the image capturing device wirelessly or with wired technology, in order to control the image capturing device features and the sound features. For example zooming in or out, moving through pictures changing definitions etc. The control unit interface can be a joystick, buttons, scroll, knob or any other interface know in the art.

Figure 5A:
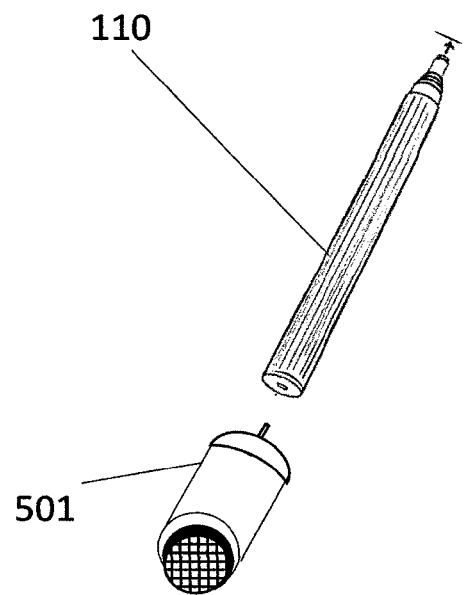
FIGS. 5A-5B schematically show an external microphone coupled to the support arm according to an embodiment of the invention.
Figure 5B:
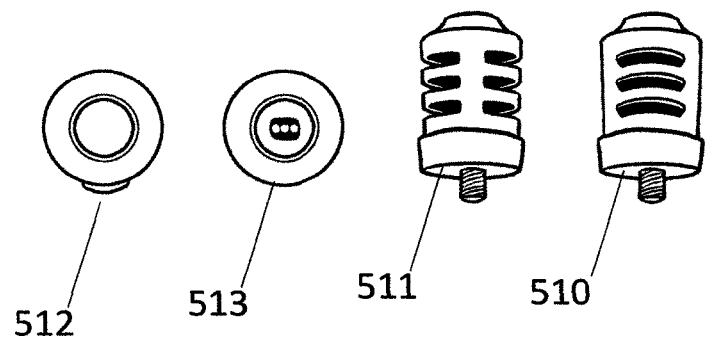

In an embodiment of the invention, and as can be seen in FIG. 5A, when the handle is removed from the proximal end of the arm 110 a sound capturing device 501 (e.g. a microphone) is assembled to said proximal end of the support arm without the handle and the operator can use the sound capturing device 501 with the support arm and the image capturing device. FIG. 5B schematically shows as an example of a microphone, which is assembled to the proximal end of the support arm 110, wherein said microphone is presented in a front view 510, a side view 511, a top view 512 and a bottom view 513.

In addition the microphone head with the inside electronics which is coupled to the handle 116, is removable and can be change with a different type of a microphone head.

Figure 6:
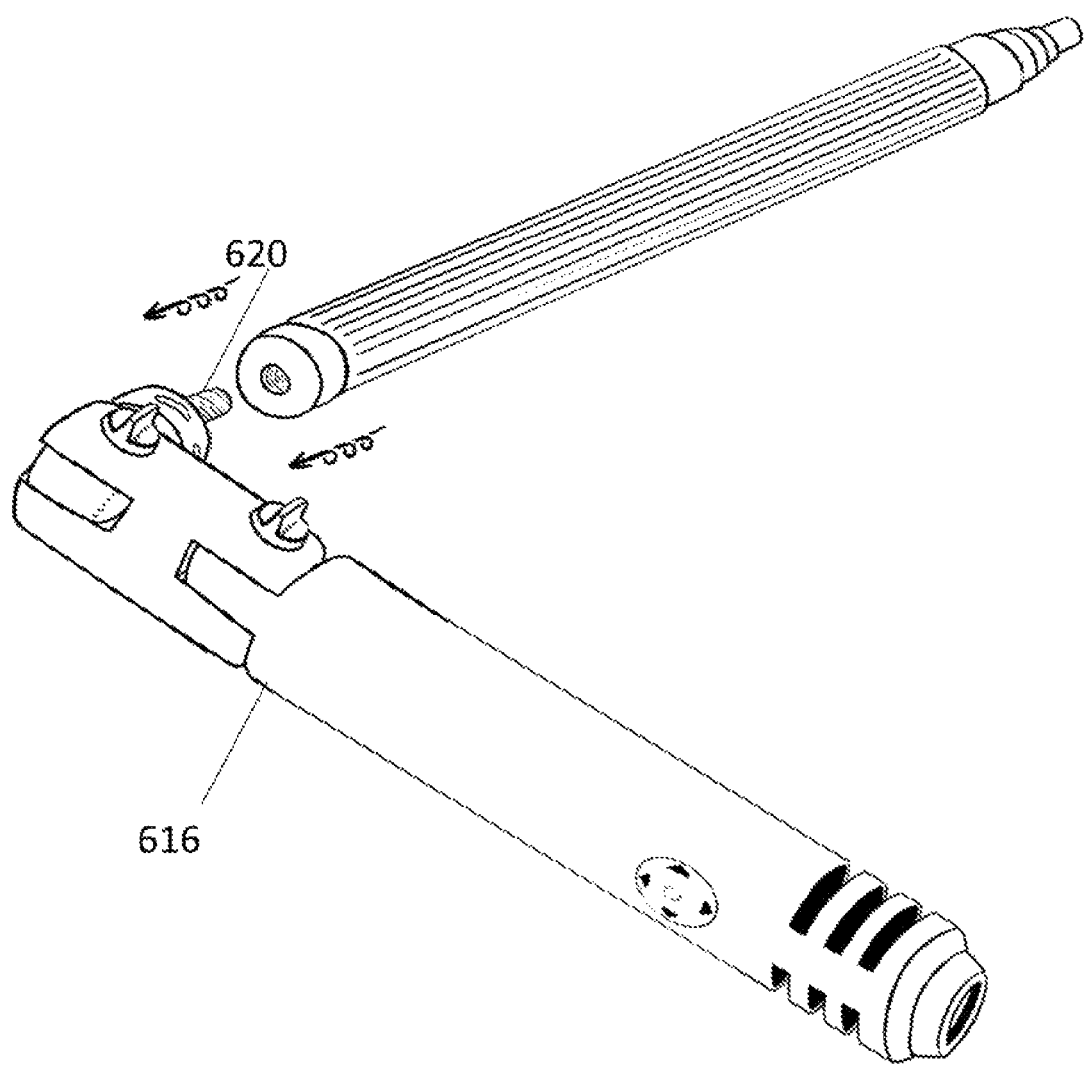
FIG. 6 schematically shows a handle with a microphone, which is connected to a support arm by screw according to an embodiment of the invention.
Figure 7:
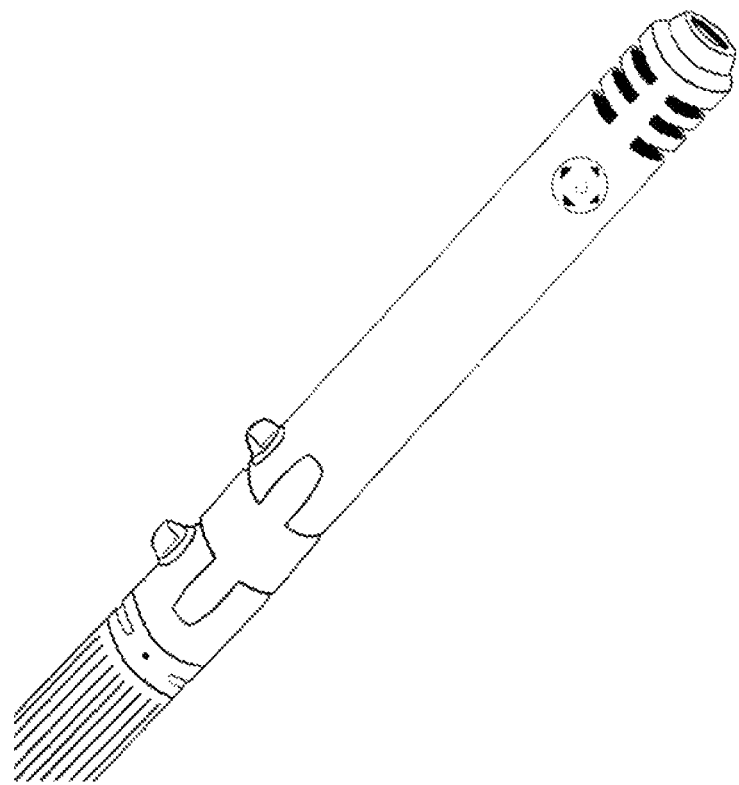
FIG. 7 schematically shows a handle-expanded configuration according to an embodiment of the invention FIG. 8 schematically shows a handle-collapsed configuration according to an embodiment of the invention.
Figure 8:
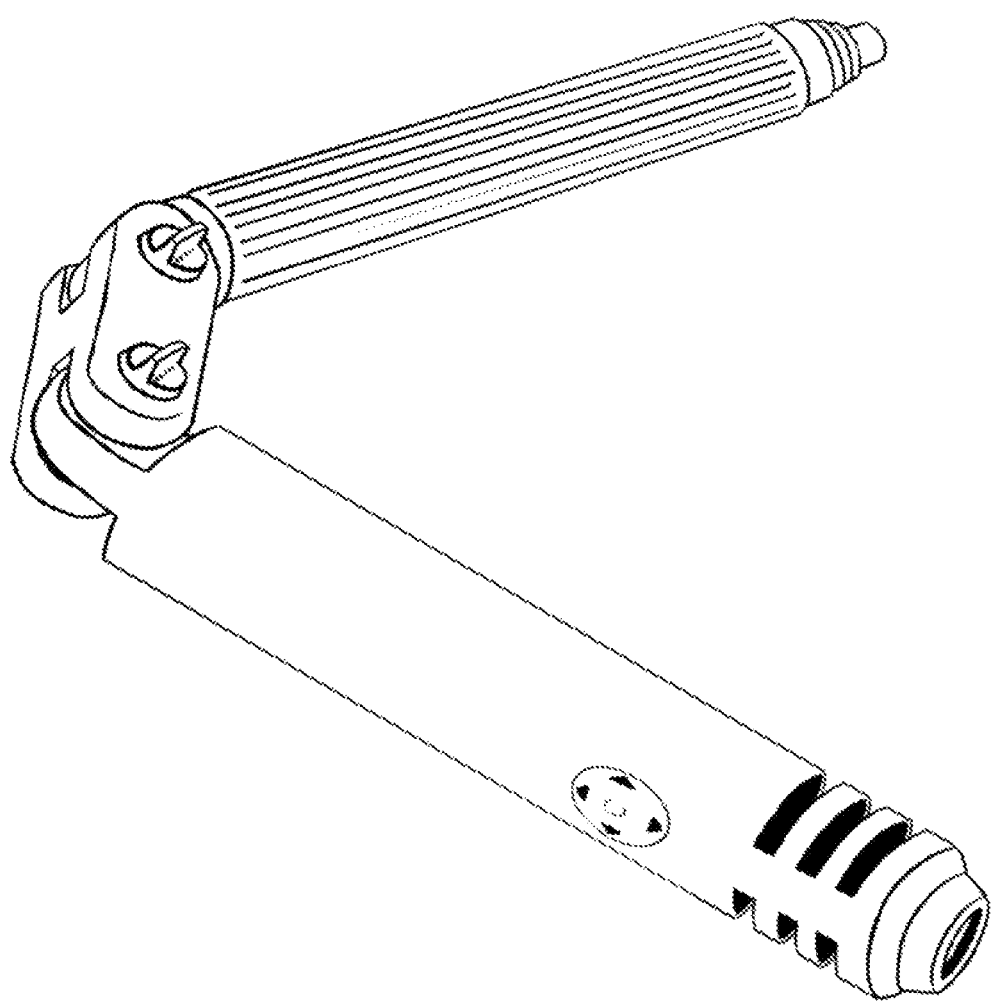
Figure 9A:
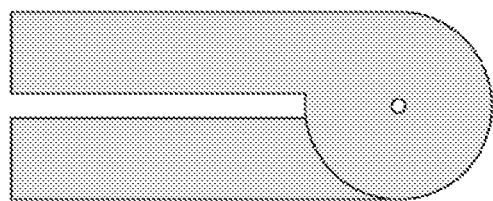
FIGS. 9A-9C schematically show different configurations of the handle according to an embodiment of the invention.
Figure 9B:
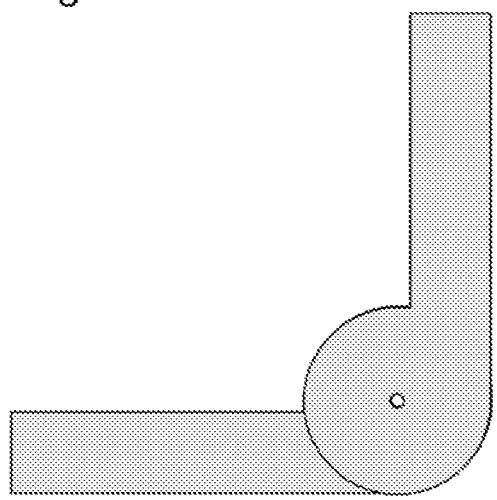
Figure 9C:
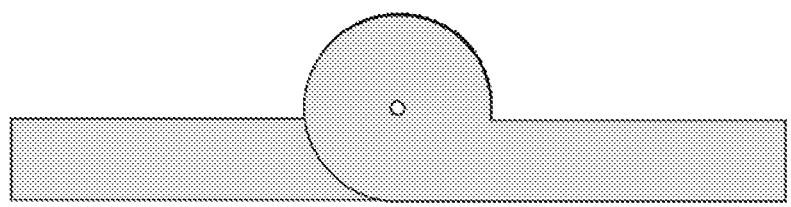

In another embodiment, and as shown in FIG. 6, a handle with a microphone 616 is connected to any support arm by screw 620. The handle may be away from the support arm into a handle-expanded configuration as shown in FIG. 7 and tiltable towards the support arm into a handle-collapsed configuration as shown in FIG. 8. In the handle-expanded configuration, the handle may be in an about vertical position relative to the support arm as can be seen in FIG. 9B, and in the handle-collapsed configuration, the handle may abut against the support arm as can be seen in FIG. 9A. The handle-collapse configuration may be useful for example in order to fold up the handle and support arm and carry them in a bag. In FIG. 9C a handle-expanded configuration is also shown.

Figure 3:
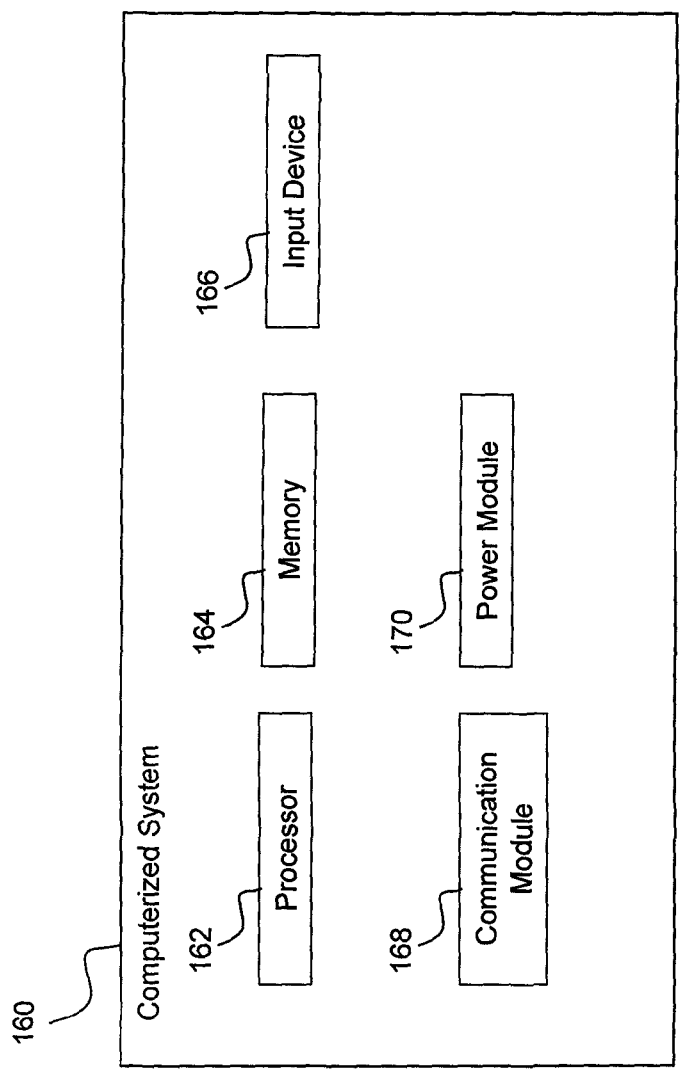
FIG. 3 is a schematic block-diagram illustration of an events capturing engine for controlling image capturing device, audio capturing device and/or their relative positions.

Additional reference is now made to FIG. 3. Events capturing apparatus 100 may comprise and/or may be coupled with components of a computerized engine 160 for controlling sound capturing device 130, image capturing device 140 and/or their position relative to each other. Computerized engine 160 may include a processor 162, a memory 164, an input device 166, a communication module 168 and a power module 170 for powering the various components of events capturing apparatus 100 and/or system 160. The various components of system 160 may communicate with each other over one or more communication buses (not shown) and/or signal lines (not shown) and/or wirelessly.

Sound capturing device 130 and/or image capturing device 140 and/or the components of system 160 may be operatively coupled with each other using wired and/or wireless communication which may include short range wireless communication protocols like, for example, Zigbee™, Bluetooth® and/or Wi-Fi protocols, and/or any other current or future communication network, standard, and/or system. The operative coupling is for illustrative and exemplary purposes only schematically illustrated in FIG. 1A by dashed line 172.

The terms "processor" as used herein may additionally or alternatively refer to a controller. Processor 162 may include and/or relate to various types of processors and/or processor architectures including, for example, embedded processors and/or communication processors.

According to some embodiments, memory 164 may include one or more types of computer-readable storage media including, for example, transactional memory and/or long-term storage memory facilities and may function as file storage, document storage, program storage, or as a working memory.

Processor 162 may be configured to run or execute various sets of instructions stored in memory 164 to result in features relating to events capturing apparatus 100, including features relating to sound capturing device 130 and/or the computerized end-user device comprising image capturing device 140. According to some embodiments, input device 166 may for example be operatively coupled with image capturing device 140 such that according to the input provided by the user, text is selectively displayed to him/her. Such text may for example be displayed on a display 144 which may be integrated with image capturing device 140. Input device 166 may for example be embodied by a wheel input element, a joystick, a knob or buttons (schematically shown in FIGS. 1A and 2B) enabling the user to control the speed of the scrolling a script's text shown on display 144. The wheel input element may for example be used to speed up, slow down or even reverse the scrolling of text, depending on the speed and direction of rotation of the wheel input element. Input device 166 may further enable the remote controlling off image capturing device 140 e.g., for zooming in and zooming out into a scene and/or rotate the device capturing different portions of the scene. Image capturing device 140 may have a front-camera (not shown) and back-camera (not shown). The image capturing device's front camera can be employed to capture a first field of view in front of the camera, and the back-camera can be employed to capture a second field of view extending opposite to the first field of view. Accordingly, the front camera can be employed to capture a first scene occurring in front of image capturing device 140, and the back camera can be employed to capture a scene occurring behind image capturing device 140 which may include the user standing behind sound capturing device 130 and the scene behind the user looking forward in direction of image capturing device 140. Input device 166 may be configured to enable switching between the front- and back camera. In some embodiments, the front and back-camera can operate simultaneously for displaying the different scenes captured the by the front and back-camera to an end-user at one or more end-user display devices (not shown). In some embodiments, the scenes captured by the front and back-camera may be displayed simultaneously on display 144 which may be integrated with image capturing device 140.

In an embodiment of the invention, a dedicated application for portable digital device (e.g. smartphones, tablets etc.) is provided. The application operates in a method which connects the handle to the portable digital device through Bluetooth and enables to control the management of the image capturing device (e.g. a camera) that is inside the portable digital device. In addition, special Bluetooth buttons which are dedicated to operate predetermined activities are adapted to control the settings of the image capturing device using the application of the present invention. For example: usually the Bluetooth buttons are used to control the volume of the sound and to move back and forward songs, however, the present invention adapts the Bluetooth buttons to operate as a scrolling buttons or for managing the menu of the image capturing device and/or of the microphone and/or of the broadcasting.

Another aspect of the application of the present invention is the connection and use of an external microphone. For example: In the prior art when a wireless microphone is connected to a smartphone through Bluetooth, it is used only for phone communications (for example: a Bluetooth speaker in a car) and not for others applications. In the present invention, the application enables to use an external microphone which is connected to the smartphone for other activities such as voice recordings or video recordings. Also, the application of the present invention enables a teleprompter presentation during the recording time.

Others applications provided by the present invention includes: changing the background of a predetermined video movie, adding visual and sound effects, switch between front and rear camera, live broadcasting to other users and to groups of users and sharing video and audio files in social media.

In an embodiment of the invention the connection of the handle to the mobile device can also be in any wireless technology such as ZigBee or WiFi.

While the components of system 160 are schematically illustrated as being implemented at a single location, this should by no means to be construed limiting. Accordingly, elements of any one of the components of system 160 may be implemented at various locations of events capturing apparatus 100. Some parts of memory 164 may for example be included in sound capturing device 130 and some in image capturing device 140 and/or comprised in any other element of the events capturing apparatus.

Communication module 168 may enable the transmission of data representative of audio and video stored in memory 164 over a wired and/or wireless communication network. Communication module 168 may for example include I/O device drivers (not shown) and network interface drivers (not shown). A device driver may for example, interface with a keypad or to a USB port. A network interface driver may for example execute protocols for the Internet, or an Intranet, Wide Area Network (WAN), Local Area Network (LAN) employing, e.g., Wireless Local Area Network (WLAN)), Metropolitan Area Network (MAN), Personal Area Network (PAN), extranet, 2G, 3G, 3.5G, 4G including for example Mobile WIMAX or Long Term Evolution (LTE) advanced, and/or any other current or future communication network, standard, and/or system.

It should be noted that the expression "mounted on" may also encompass the meaning of the expression "mounted in" or "included in".

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A holding assembly for a portable digital device for supporting and interacting with an image capturing device via wired or unwired communication network, said assembly comprising:
   a) an elongated, longitudinally extending support arm including a distal coupling joint member at its distal end, said distal coupling joint member configured to removably receive the image capturing device;
   b) a sound capturing device coupled to the proximal end of said support arm;
   c) a control unit provided with a user interface, which enables controlling the settings of the image capturing device and/or of said sound capturing device and/or of a broadcasting using a dedicated application; and
   d) a handle coupled to said proximal end of said elongated support arm in a handle-expanded configuration with said handle in a generally perpendicular orientation relative to the longitudinal extension of said support arm, said elongated support arm configured to hold the generally perpendicularly oriented handle at one end of said support arm distal from the image capturing device at the other end of said support arm, in the handle-expanded configuration.

2. The assembly of claim 1, wherein the handle includes a single handle member.

3. The assembly of claim 1, wherein the handle includes two handle members.

4. The assembly of claim 1, wherein the handle has an oval shaped body.

5. The assembly of claim 1 wherein the handle comprises one or more metal plate(s) with peripheral edges for allowing one or more magnet(s) to be attached thereto in a stable manner.

6. The assembly of claim 1, wherein the handle is tiltable towards the support arm into a handle-collapsed configuration and away from the support arm into the handle-expanded configuration.

7. The assembly of claim 1, wherein the handle is pivotable relative to the support arm.

8. The assembly of claim 1, wherein the image capturing device is provided in a portable digital device.

9. The assembly of claim 1, wherein the image capturing device is provided in a portable electronic device having imaging and sound recording capabilities.

10. The assembly of claim 1, wherein the sound capturing device coupled to the proximal end of the support arm is removable.

11. The assembly of claim 1, further comprising a display and an input device operatively coupled with the display for controlling the scrolling of text and/or images on the display.

12. The assembly of claim 1, wherein the user interface of the control unit is one of the following: a joystick, a scroll, buttons or a knob.

13. The assembly of claim 6, wherein in the handle-expanded configuration, the handle is in a vertical position relative to the support arm, and when in the handle-collapsed configuration, said handle abuts against said support arm.

* * * * *